United States Patent

Perez et al.

(10) Patent No.: US 9,912,001 B2
(45) Date of Patent: Mar. 6, 2018

(54) EXTRUDER FEED SYSTEM

(71) Applicant: Massachusetts Institute of Technology, Cambridge, MA (US)

(72) Inventors: Alfonso Alexander Perez, West Palm Beach, FL (US); Christopher Michael Haid, Bolton, MA (US); Mateo Pena Doll, Elk, CA (US); Forrest W. Pieper, Nederland, CO (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 361 days.

(21) Appl. No.: 14/448,364

(22) Filed: Jul. 31, 2014

(65) Prior Publication Data

US 2015/0086668 A1 Mar. 26, 2015

Related U.S. Application Data

(60) Provisional application No. 61/863,110, filed on Aug. 7, 2013.

(51) Int. Cl.
*B29C 47/10* (2006.01)
*B29C 67/00* (2017.01)
(Continued)

(52) U.S. Cl.
CPC ......... *H01M 8/188* (2013.01); *B29C 47/0806* (2013.01); *B29C 47/1045* (2013.01);
(Continued)

(58) Field of Classification Search
CPC ............ B29C 47/0806; B29C 47/1045; B29C 67/0055; B29C 64/393; B29C 64/321;
(Continued)

(56) References Cited

U.S. PATENT DOCUMENTS 4,069,985 A * 1/1978 Lohest ................... B65H 54/40
242/486
5,121,329 A * 6/1992 Crump ................... B22F 3/115
228/180.5

(Continued)

FOREIGN PATENT DOCUMENTS

| CN | 102596543 A | 7/2012 |
|---|---|---|
| EP | 0581445 A1 | 2/1994 |
| WO | 2009/134298 A2 | 11/2009 |

OTHER PUBLICATIONS

Transmittal of the International Search Report and the Written Opinion for PCT/US2014/049570 dated Nov. 3, 2014.
(Continued)

*Primary Examiner* — Yogendra N Gupta
*Assistant Examiner* — Emmanuel S Luk
(74) *Attorney, Agent, or Firm* — Gesmer Updegrove LLP

(57) ABSTRACT

Extruder feed system. The system includes a pair of spaced-apart, internally and oppositely threaded rotatable elements for receiving and engaging a plastic filament material. An electric motor rotates the rotatable elements in opposite directions thereby to drive the filament into a liquefier chamber for subsequent discharge through a nozzle. The system provides very accurate layer-by-layer build up.

8 Claims, 2 Drawing Sheets

(51) Int. Cl.
  *B29C 47/08* (2006.01)
  *H01M 8/18* (2006.01)
  *B29C 64/393* (2017.01)

(52) U.S. Cl.
  CPC ....... *B29C 64/393* (2017.08); *H01M 2250/10* (2013.01); *Y02B 90/14* (2013.01); *Y02E 60/528* (2013.01)

(58) Field of Classification Search
  CPC .. B29C 64/209; H01M 8/188; H01M 2250/10
  See application file for complete search history.

(56) References Cited

U.S. PATENT DOCUMENTS

| | | | | |
|---|---|---|---|---|
| 5,633,021 | A * | 5/1997 | Brown | B29C 41/36 222/526 |
| 5,764,521 | A * | 6/1998 | Batchelder | B29C 41/36 156/244.21 |
| 5,816,466 | A * | 10/1998 | Seufer | B23K 9/1333 226/187 |
| 6,041,191 | A * | 3/2000 | Saito | G03B 1/50 355/40 |
| 6,085,957 | A * | 7/2000 | Zinniel | B65H 51/30 226/43 |
| 7,026,574 | B2 * | 4/2006 | Belfiore | B23K 9/1336 219/137.7 |
| 7,384,255 | B2 * | 6/2008 | LaBossiere | B29C 67/0055 226/187 |
| 7,604,470 | B2 * | 10/2009 | LaBossiere | B29C 67/0055 425/131.1 |
| 7,624,908 | B2 * | 12/2009 | Enyedy | B23K 9/1336 219/137.71 |
| 7,896,209 | B2 * | 3/2011 | Batchelder | B29C 67/0055 226/53 |
| 8,422,797 | B2 | 4/2013 | Heisele | |
| 8,450,647 | B2 * | 5/2013 | Leiteritz | B23B 27/24 219/137.7 |
| 8,512,024 | B2 * | 8/2013 | Pax | B29C 47/0014 226/181 |
| 8,569,653 | B2 * | 10/2013 | Enyedy | B23K 9/1336 219/136 |
| 8,575,517 | B2 * | 11/2013 | Ertmer | B23K 9/1336 219/137.2 |
| 8,827,684 | B1 * | 9/2014 | Schumacher | B29C 67/0055 264/308 |
| 9,162,395 | B2 * | 10/2015 | Lee | B29C 67/0096 |
| 9,321,609 | B2 * | 4/2016 | Koop | B65H 51/10 |
| 9,339,975 | B2 * | 5/2016 | Molinari | B29C 67/0088 |
| 9,463,524 | B2 * | 10/2016 | Garvey | B23K 9/1336 |
| 9,469,071 | B2 * | 10/2016 | Douglass | B29C 67/0055 |
| 9,481,133 | B2 * | 11/2016 | Carbone | B29C 67/0055 |
| 2001/0030383 | A1 * | 10/2001 | Swanson | B29C 41/36 264/308 |
| 2001/0038025 | A1 * | 11/2001 | Brenk | B65H 51/10 226/187 |
| 2006/0005525 | A1 * | 1/2006 | Moser | D02G 1/082 57/339 |
| 2009/0035405 | A1 * | 2/2009 | Leavitt | B29C 47/0021 425/97 |
| 2009/0273122 | A1 * | 11/2009 | Batchelder | B29C 47/0014 264/401 |
| 2009/0274540 | A1 | 11/2009 | Batchelder | |
| 2009/0295032 | A1 * | 12/2009 | Hopkins | B29C 67/0055 264/308 |
| 2010/0327479 | A1 * | 12/2010 | Zinniel | B29C 47/0014 264/172.14 |
| 2011/0076495 | A1 * | 3/2011 | Batchelder | B29C 47/0038 428/369 |
| 2012/0105903 | A1 * | 5/2012 | Pettis | G06F 3/12 358/1.14 |
| 2012/0189729 | A1 * | 7/2012 | Pax | B29C 47/0014 425/378.1 |
| 2013/0164960 | A1 * | 6/2013 | Swanson | B29C 67/0055 439/199 |
| 2013/0313743 | A1 * | 11/2013 | Rockhold | B29C 67/0088 264/40.1 |
| 2014/0044823 | A1 * | 2/2014 | Pax | B29C 47/12 425/143 |
| 2015/0037446 | A1 * | 2/2015 | Douglass | B29C 67/0055 425/131.1 |
| 2015/0084222 | A1 * | 3/2015 | Heston | B29C 47/003 264/40.7 |
| 2016/0023387 | A1 * | 1/2016 | Takaoka | B29C 47/0016 442/1 |
| 2016/0052206 | A1 * | 2/2016 | Fruth | B29C 31/042 425/132 |
| 2016/0068678 | A1 * | 3/2016 | Luo | C08L 75/04 264/308 |
| 2016/0075089 | A1 * | 3/2016 | Duro Royo | B29C 67/0088 264/308 |

OTHER PUBLICATIONS

Mark Rehorst, "First test of nut drive extruder," Feb. 2, 2014.
Transmittal of the International Search Report and the Written Opinion for PCT/US2014/049563 dated Oct. 31, 2014.
Ren C. Luo et al, "Desktop Rapid Prototyping System With Supervisory Control and Monitoring Through Internet", Dec. 1, 2001 vol. 6, No. 4, IEEE Service Center, Piscataway, NJ, US.
Hoelzle D J et al, "Iterative Learning Control for robotic deposition using machine vision", Jun. 11, 2008, pp. 4541-4547, IEEE Service Center, Piscataway, NJ, US.
Canadian Examiner's report for Canadian Application No. 2919511 dated Mar. 15, 2017.
Examination Report No. 3 for standard patent application 2014306218 dated May 5, 2017.
Australian Examination Report No. 4 for Standard patent Application for Application No. 2014306223 dated May 8, 2017.
English Translation of Chinese Search Report for Patent Application No. 2014800434687.
English Translation of Third Office Action for Application No. 201480043468.7 dated Aug. 7, 2017.
Office Action issued by the Chinese Patent Office dated Dec. 6, 2017 in related Application No. 201480043468.7.
Office Action issued by the Canadian Patent Office dated Nov. 29, 2017 in related Application No. 2,919,511.

* cited by examiner ial material may cally determined that there is a direct relationship between

EXTRUDER FEED SYSTEM

This application claim priority to provisional application Ser. No. 61/863,110 filed on Aug. 7, 2013, the contents of which are incorporated herein by reference.

BACKGROUND OF THE INVENTION

This invention relates to an extruder, and more particularly, to an extruder used in an additive manufacturing device employing a screw drive.

Additive manufacturing devices such as 3-D printers build up an object layer-by-layer by extruding a filament material onto a support surface. The quality of the object produced depends in large measure on tight control of the flow rate of filament material through the extruder in conjunction with control of the X-Y position of the extruder head as it traverses an area to build up a layer.

A prior art extruder system is shown schematically in FIG. 1. Filament material 10 passes through a pinch roller feed system 12 that drives the filament material 10 downwardly into a liquefier chamber 14. Thereafter, filament material is discharged through a nozzle 16 onto a scaffolding 18. The pinch roller system 12 engages the filament material 10 on each side as it drives the filament material into the liquefier chamber 14. The driving forces that can be achieved with the arrangement in FIG. 1 is limited. Further, the arrangement shown in FIG. 1 is not as accurate as desired because of step size limitations in motor systems driving the pinch rollers.

It is also known to use an internally threaded nut to drive a filament into a liquefier chamber. In this case, the filament passes through an internally threaded nut which, upon rotation, drives the filament material linearly. However, the nut rotation puts an unwanted torque on the filament causing it to distort as it is driven linearly.

An object of the present invention is a screw drive employing counter-rotating elements to substantially eliminate the unwanted torque while driving the filament into the extruder.

SUMMARY OF THE INVENTION

The extruder feed system according to the invention includes a pair of spaced-apart, internally and oppositely threaded rotatable elements for receiving and engaging a filament material. A motor is provided for rotating the rotatable elements in opposite directions, thereby to drive the filament into a liquefier chamber for subsequent discharge through a nozzle. In a preferred embodiment, the system includes a gear train driven by the motor to rotate the rotatable elements in opposite directions. A suitable motor is a stepper motor or a DC motor. The filament material may be plastic.

In a preferred embodiment, they gear train includes beveled gears driven by the motor. The gear train may include a belt or cable driven with pulleys.

In yet another embodiment, the system of the invention further includes a control loop for controlling power of the motor, thereby to control the filament material extrusion rate.

DESCRIPTION OF THE PREFERRED EMBODIMENT

Figure 2:
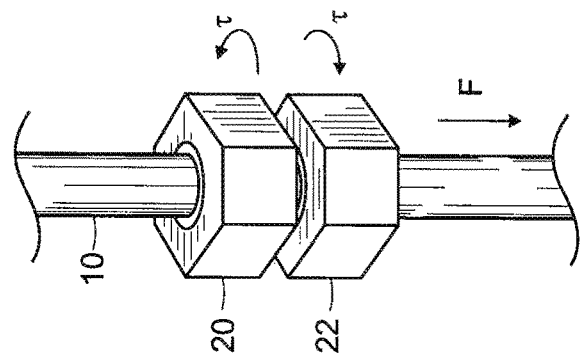
FIG. 2 is a schematic illustration of a pair of counter-rotatable hex nuts for driving a filament material.

With reference to FIG. 2, filament material 10 is seen passing through the interior of first and second hex nuts 20 and 22. The hex nut 20 is internally threaded in, for example, a right-handed thread pattern. Similarly, the hex nut 22 is infernally threaded to have the opposite direction for the threads, such as a left-handed thread pattern. It is preferred that the diameter of the filament 10 be slightly oversized with respect to the tapped hole through the hex nuts 20 and 22. As can be seen in the figure, the hex not 20 is rotated in a counterclockwise direction and the hex nut 22 is rotated in a clockwise direction. Because the threads of the counter rotating hex nuts 20 and 22 are oppositely directed, the filament material 10 is driven downwardly in FIG. 2.

Importantly, because the hex nuts 20 and 22 are counter-rotating, material distortion resulting from torque between the two hex nuts is substantially eliminated as the counter-rotating nuts balance out the torque effects.

Figure 1:
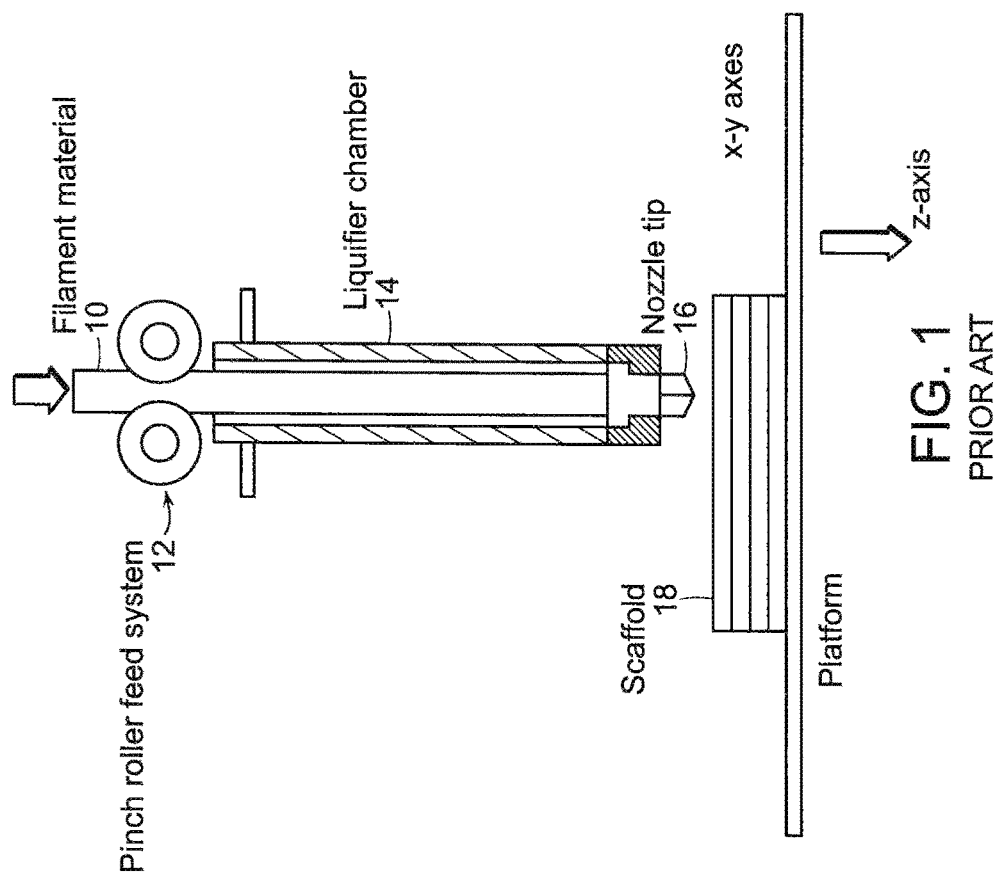
FIG. 1 is a cross-sectional view of a prior art additive manufacturing extruder system.
Figure 3:
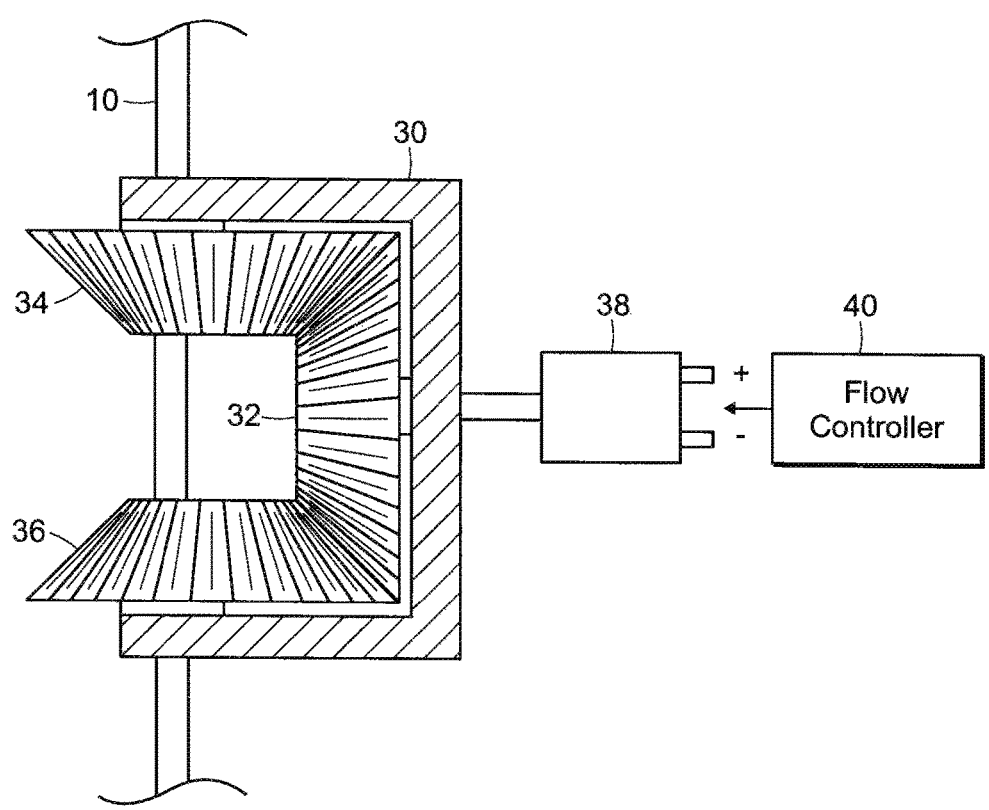
FIG. 3 is a cross-sectional view of an embodiment of the invention disclosed herein utilizing a motor, a flow controller and bevel gears driving the counter-rotating bevel gears.

An embodiment of the present invention is shown in FIG. 3. A frame 30 supports for rotation bevel gears 32, 34 and 36. A motor 38 under the control of a flow controller 40 rotates the bevel gear 32. The bevel gear 32 operatively engages the bevel gears 34 and 36 driving these bevel gears in opposite rotational directions. As will be appreciated, the interior of the bevel gear 34 is threaded in a first sense, such as right-handed, and the bevel gear 36 is internally threaded in the opposite sense such as left-handed. When the motor 38 is activated under control of the flow controller 40, the filament 10 will be driven into a liquefier chamber as shown in FIG. 1. The motor 38 may be a stepper motor or a DC motor. The motor may be a pneumatic motor, internal combustion engine or an AC motor. The arrangement of the motor 38 shown in FIG. 3 assures that the flow rate of filament 10 material through the system can be precisely controlled.

Those of skill in the art will recognize that separate motors could be used to drive the rotatable elements if desired. It is also noted that the space between the bevel gears 34 and 36 should be made small to minimize distortion of the filament passing through the counter-rotating bevel gears. The gap in FIG. 3 is exaggerated for clarity.

The inventors herein have determined that driving the bevel gears 34 and 36 at the same speed in opposite directions isn't sufficient to ensure a constant extrusion rate due to variabilities in the diameter of the filament 10 and other physical inconsistencies. The inventors have analytically determined that there is a direct relationship between the extrusions rate and the input electrical power to the motor 38 using the screw drive of the invention. In particular, the inventors have determined that the extrusion rate Q=kIV. That is to say, filament flow rate Q is linearly proportional to power (IV) on the motor 38. As an example, if one wishes to have a constant flow rate, the electrical power to the motor 38 is held constant (that is to say, the product of motor current (I) and motor voltage (V) is held constant). To increase or decrease the flow rate, the motor 38 voltage is controlled via a PWM control on the motor 38. Thus, filament flow rate is controlled by controlling power to the motor 38. The flow controller 40 may include a conventional control loop employing PID control for example.

It is recognized that modifications and variations of the present invention will be apparent to those of ordinary skill in the art and it is intended that all such modifications and variations be included within the scope of the appended claims.

What is claimed is:

1. Extruder feed system comprising:
 a pair of spaced-apart, internally and oppositely threaded rotatable elements for receiving and engaging a filament material;
 an electrical motor for rotating the rotatable elements in opposite directions thereby to drive the filament into a liquefier chamber for subsequent discharge through a nozzle; and
 further including a control loop for controlling the product of motor current and motor voltage thereby to control the filament material extrusion rate that is linearly proportional to the product of motor current and motor voltage.

2. The system of claim 1 further including a gear train driven by the motor to rotate the rotatable elements in opposite directions.

3. The system of claim 1 wherein the motor is a stepper motor.

4. The system of claim 1 wherein the motor is a DC motor.

5. The system of claim 2 wherein the gear train includes a beveled gear driven by the motor.

6. The system of claim 1 wherein the rotatable elements are internally threaded hex nuts.

7. The system of claim 1 wherein the motor is an AC motor.

8. The system of claim 2 wherein the gear train includes a belt or cable driven with pulleys.

* * * * *